United States Patent
Allen, Jr. et al.

(10) Patent No.: US 8,130,650 B2
(45) Date of Patent: Mar. 6, 2012

(54) RETRO FLOW CONTROL FOR ARRIVING TRAFFIC IN COMPUTER NETWORKS

(75) Inventors: James Johnson Allen, Jr., Raleigh, NC (US); Brian Mitchell Bass, Apex, NC (US); Gordon Taylor Davis, Chapel Hill, NC (US); Clark Debs Jeffries, Durham, NC (US); Jitesh Ramachandran Nair, Kerala (IN); Ravinder Kumar Sabhikhi, Cary, NC (US); Michael Steven Siegel, Raleigh, NC (US); Rama Mohan Yedavalli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/174,999

(22) Filed: Jul. 17, 2008

(65) Prior Publication Data
US 2008/0273464 A1   Nov. 6, 2008

Related U.S. Application Data

(63) Continuation of application No. 10/161,000, filed on Jun. 3, 2002, now Pat. No. 7,430,169.

(51) Int. Cl.
    *H04L 12/26* (2006.01)
(52) U.S. Cl. .......... 370/235; 370/414; 370/429

(58) Field of Classification Search .......... None
See application file for complete search history.

(56) References Cited

U.S. PATENT DOCUMENTS

| | | | |
|---|---|---|---|
| 6,333,917 B1 | 12/2001 | Lyon et al. | |
| 6,463,068 B1 * | 10/2002 | Lin et al. | 370/414 |
| 6,788,697 B1 | 9/2004 | Aweya et al. | |
| 6,829,224 B1 | 12/2004 | Goldman et al. | |
| 7,002,980 B1 * | 2/2006 | Brewer et al. | 370/414 |
| 7,158,480 B1 * | 1/2007 | Firoiu et al. | 370/235 |
| 7,359,321 B1 * | 4/2008 | Sindhu et al. | 370/230 |
| 7,430,169 B2 * | 9/2008 | Allen et al. | 370/235 |
| 2001/0051992 A1 * | 12/2001 | Yang et al. | 709/207 |
| 2002/0131365 A1 | 9/2002 | Barker et al. | |
| 2002/0159388 A1 * | 10/2002 | Kikuchi et al. | 370/229 |
| 2003/0058793 A1 | 3/2003 | Rochon et al. | |

* cited by examiner

*Primary Examiner* — Brian Roberts
(74) *Attorney, Agent, or Firm* — Josh G. Lockburn; Yuanmin Cai (57) ABSTRACT

The decision within a packet processing device to transmit a newly arriving packet into a queue to await further processing or to discard the same packet is made by a flow control method and system. The flow control is updated with a constant period determined by storage and flow rate limits. The update includes comparing current queue occupancy to a threshold. The outcome of the update is adjustment up or down of the transmit probability value. The value is stored for the subsequent period of flow control and packets arriving during that period are subject to a transmit or discard decision that uses that value.

18 Claims, 5 Drawing Sheets

RETRO FLOW CONTROL FOR ARRIVING TRAFFIC IN COMPUTER NETWORKS

CROSS REFERENCE TO RELATED PATENT APPLICATIONS

Pursuant to 35 USC §120, this continuation application claims priority to and benefit of U.S. Utility patent application Ser. No. 10/161,000, filed Jun. 3, 2002, entitled "RETRO FLOW CONTROL FOR ARRIVING TRAFFIC IN COMPUTER NETWORKS".

BACKGROUND

The present invention relates to congestion management in computer networks in general and, in particular, to flow control in response to congestion.

A switch is a network node that directs datagrams on the basis of Medium Access Control (MAC) addresses, that is, Layer 2 in the OSI model well known to those skilled in the art [see "The Basics Book of OSI and Network Management" by Motorola Codex from Addison-Wesley Publishing Company, Inc., 1993]. A switch can also be thought of as a multiport bridge, a bridge being a device that connects two LAN segments together and forwards packets on the basis of Layer 2 data. A router is a network node that directs datagrams on the basis of finding the longest prefix in a routing table of prefixes that matches the Internet Protocol (IP) destination addresses of a datagram, all within Layer 3 in the OSI model. A Network Interface Card (NIC) is a device that interfaces a network such as the Internet with an edge resource such as a server, cluster of servers, or server farm. A NIC might classify traffic in both directions for the purpose of fulfilling Service Level Agreements (SLAs) regarding Quality of Service (QoS). A NIC may also switch or route traffic in response to classification results and current congestion conditions. The present invention applies to a network node that can be a switch, a router, NIC, or, more generally, a machine capable of both switching and routing functions based upon classification results and current congestion conditions.

Network processing in general entails examining packets and deciding what to do with them. This examination can be costly in terms of processing cycles, and traffic can arrive irregularly over time. Consequently network nodes (e.g., node 104 of FIG. 1) in general provide some amount of storage for packets awaiting processing (e.g., storage memory 109 of FIG. 1). During episodes of congestion, some arriving packets might be purposefully discarded to avoid uncontrolled overrunning of the storage. This is flow control.

All arriving traffic in a network processor can be stored in a Queue. Conventionally, the next step after this is to pass packets to Multifield Classification (MFC). If MFC is computationally complex for some packets, then the Queue can fill to the point that arriving packets are discarded, regardless of value. This discard action can be by virtue of Queue occupancy crossing a threshold.

A common prior art flow control is called Random Early Detection (RED). As queue length grows from 0 to full storage capacity, RED at first transmits all packets into the queue, then, if occupancy exceeds a threshold Lo >=0%, a decreasing fraction of packets into the queue, and finally, if occupancy exceeds a threshold Hi <=100%, completely discarding all arriving packets. For queue occupancy Q that is between Lo and Hi, the fraction T of packets transmitted can be a linear function of the following form:

$$T(Q)=1-(1-Tmin)*(Q-Lo)/(Hi-Lo)$$

Here Tmin is a minimum transmitted fraction reached as Q increases to Hi. Many variations on this theme are practiced in the prior art; for example, Q might actually be an exponentially weighted moving average of queue occupancy. As another example, Lo=Hi and Tmin=0, the special case known as taildrop.

The use of RED or its variants unfortunately can imply some undesirable consequences including:
1. Methods ignore rate of change (queue going up, down)
2. High thresholds can cause high latency or lack of headroom for bursts
3. Low thresholds can cause burst-shaving (low utilization)
4. There is no direct relationship between thresholds and performance
5. Administrative input needed as offered loads change
6. Hand-tuning thresholds widely recognized as difficult
7. Little or no guidance in vendor documents.

A drawback with the prior art techniques is that the decision to transmit into a queue or discard an arriving packet is made in the device based upon heuristically determined thresholds or functions. In view of the above, more efficient apparatus and methods are required to make connection allocation decisions in high speed networks.

SUMMARY

The present invention describes a system and method for making intelligent, high-speed automatic flow control decisions.

The present invention enables a kind of retroactive flow control for the Queue that has the effect of discarding some Best Effort packets if necessary while transmitting all Premium packets during episodes of Multi-Field Classification (MFC) congestion.

The term Best Effort in this document refers to the traffic that has no guarantees regarding service. There might be other types of traffic (such as voice packets, video packets, video conferencing packets, other realtime packets, business data packets or network control packets) present in a network, and all such types are aggregated into one type called herein Premium.

In a preferred embodiment, all arriving traffic accumulates in a First-In-First-Out (FIFO) buffer. Service events occur. At each service event, the packet at the head of the line is examined. If it is a Premium packet, then it is transmitted into the next process such as Multi-Field Classification (MFC). If it is a Best Effort packet, then the current value of a transmit probability is fetched. The transmit probability T is a number in the interval [0, 1]. In a preferred embodiment, the transmit probability may have a finite number of bits of accuracy such as 15. At the same time a random number with the same range [0, 1] and the same number of bits of accuracy is fetched. The two numbers are compared. If the transmit probability is greater than or equal to the random number, then the same Best Effort packet is transmitted into the next process such as MFC. If the transmit probability is less than the random number, then the same Best Effort packet is transmitted into a discard process. In a preferred embodiment, the number of computational cycles consumed by the discard process is much less than the number of computational cycles consumed by complete transmission of a packet into the next process such as MFC.

In some processes Queue occupancy is measured in Ethernet frames that can be of variable size (64 Bytes to 1518 Bytes), not bits or the equivalent. Thus there is no strict equivalence of Queue occupancy and shared memory resource depletion. There can be, however, worst case estimates, namely, estimating that all frames are of the maximum possible size in bits.

At discrete time intervals of length Dt, the value of a transmit probability T is refreshed. How it is refreshed is included in the present invention. The use of T includes comparing T to a random number every time a packet arrives during the time interval. The packet is transmitted into the next process such as MFC for subsequent processing if the value of T is greater than or equal to the value of the random number. The packet is discarded if the value of T is less than the random number.

The present invention calculates at time t the value T(t+Dt) of transmit probability to use during the time interval [t, t+Dt) by application of an algorithm. The inputs to the algorithm are the previous transmit probability T(t) used during the interval [t−Dt, t) and the Queue frame count queue occupancy Q(t) at time t compared to a threshold Th. The threshold Th in preferred embodiment might be, when all frames are of maximum size, of the capacity of a shared data store. Details are given below.

The period of flow control update is denoted Dt. In a preferred embodiment, if the total capacity of the storage queue is denoted Qmax and if the maximum rate of flow into or from the storage buffer is S, then the time interval Dt is defined by Dt=Qmax/(8*S). The maximum possible change in the occupancy of the queue in any time interval Dt is ⅛ of the queue storage capacity Qmax. In this document * represents multiplication.

Denote Queue occupancy at time t as Q(t). Furthermore, the value of the transmit probability T at time t, that is, T(t) is used. The invention uses inputs T(t) and Q(t) compared to a threshold Th. These inputs are used to calculate the next transmit probability T(t+Dt) by use of the following steps:
Algorithm A
1. If Q(t)>Th, then T(t+Dt)=Dec*T(t)
2. If Q(t)<=Th, then T(t+Dt)=minimum {1, T(t)+Inc}
Here Dec and Inc are constants in the interval [0, 1]. In a preferred embodiment, the value of Dec is 31/32 and the value of Inc is 1/32.

The consequence of Algorithm A is that if the combined Best Effort and Premium loads cause consistently high Queue occupancy, then the transmit fraction T continues to decrease until the situation is corrected. Likewise, if the combined Best Effort and Premium loads cause consistently low Queue occupancy, then the transmit fraction T continues to increase until it reaches 1 and all Best Effort traffic is transmitted.

The present invention is superior to prior art techniques. Specifically, the present invention can exhibit both lower queue occupancy during congestion caused by steady loads and higher utilization during congestion caused by bursty loads. Furthermore the present invention does not require tuning. For the special case of constant input to the queue and constant service rate from the queue, this enables complete characterization of equilibrium states, meaning states at which the transmit probability has reached a value such that queue occupancy is constant (that is, Q(t−Dt)=Q(t)).

DETAILED DESCRIPTION OF EMBODIMENTS

The following is a detailed description of novel embodiments depicted in the accompanying drawings. The embodiments are in such detail as to clearly communicate the subject matter. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

While some of the specific embodiments described below will reference the embodiments with specific configurations, those of skill in the art will realize that embodiments of the present disclosure may advantageously be implemented with other configurations with similar issues or problems.

Figure 1:
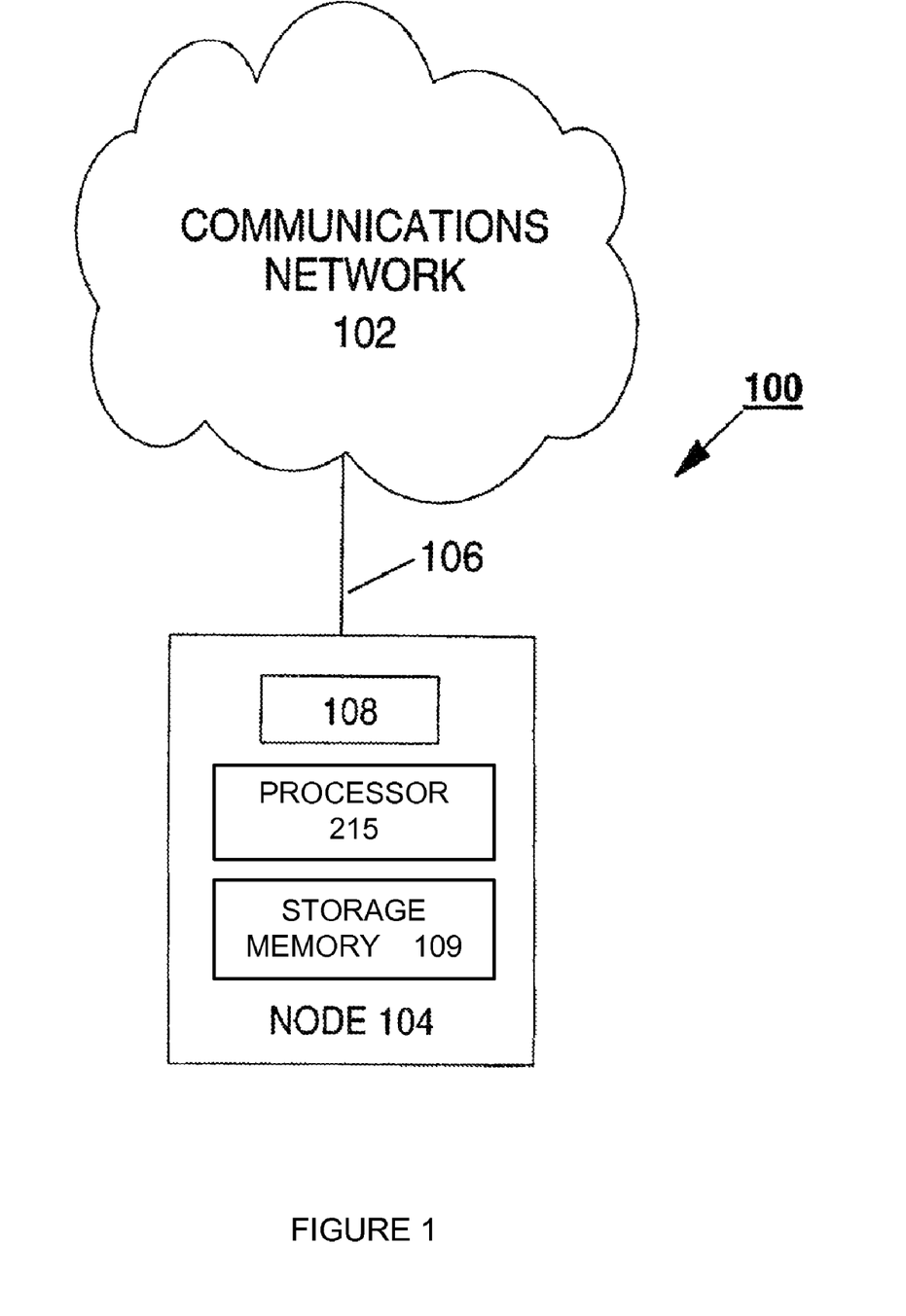
FIG. 1 shows a block diagram of a communications network including the flow control system according to the teachings of the present invention.

FIG. 1 shows a communications system 100 according to the teachings of the present invention. The communications system includes a communications network 102 coupled through transmission media 106 to a node 104. The communications network 102 can be any of or a combination of known communications infrastructure such as the Internet, private networks, Local Area Network (LAN), wide are network (WAN), etc. Even though a single node is shown it will be readily recognized by those skilled in the art that a multiplicity of nodes can be and, usually, are interconnected via the communications network 102. The node can be any of the well known network devices such as routers, switches, etc. The common practice in designing network devices is to use network processors, such as the IBM PowerNP NP4GS3 manufactured and marketed by IBM Corporation. The flow control system 108 according to the teachings of the present invention is provided in node 104. In particular the flow control system of the present invention could be implemented (to manage different types of Queues, including the General Data Queue, GDQ) in the PowerNP NP4GS3 or similar devices used in node 104.

Figure 2:
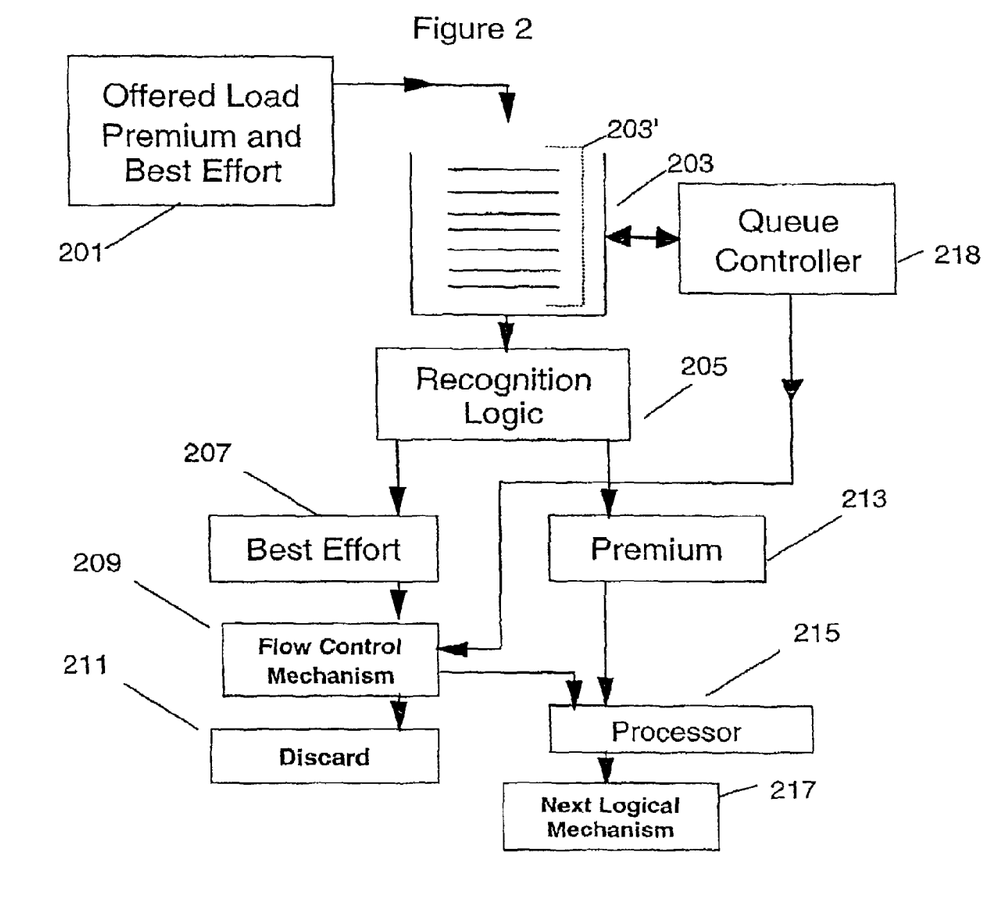
FIG. 2 shows a more detailed block diagram of the flow control system according to teachings of the present invention. All traffic (Premium and Best Effort) is allowed to enter the queue, but at a service event, some Best Effort might be recognized as such and discarded at high speed.

Referring to FIG. 2, flow control as taught by the present invention is depicted. All packets, both Premium and Best Effort, are part of an offered load 201, all of which enter a queue 203' in a buffer 203. When a service event occurs, the identity of the next packet is recognized by recognition logic 205. If the packet is a Best Effort packet 207, then its logical path points to flow control mechanism 209. Flow control mechanism 209 decides using current congestion information provided by queue controller 218 whether to discard 211 the packet or to transmit the packet to a processor 215 for further processing. If recognition 205 determines that the packet is a Premium packet, then it is automatically sent to the processor 215. The processor sends packets into the next logical mechanism 217 (for example, Multi-Field Classification), a function provided in the Network Processor and not germane to the present invention. Flow control mechanism 209 is a component in a network system that controls the flow of network data, such as a flow control mechanism described in the document entitled "Transmission Control Protocol/Internet Program (TCP/IP) Protocol Specification," published September, 1981.

The queue controller 218 monitors the queue and forwards information that is used by flow control mechanism 209 to decide whether the best effort traffic is sent to processor 215 or sent to Discard 211. The Queue Controller 218 includes devices that measure queue occupancy (i.e. length of queue). The devices may include counters that count frames in the queue or sensors that measure the length of frames in the queue. The devices may also include special sensors that measure predetermined threshold values, such as minimum, maximum, etc.

Still referring to FIG. 2, the Recognition logic includes examination of bits in the packet header. In one possible preferred embodiment, the bits can be the six bits of the Differentiated Services Code Point in the IP header as defined in RFC 2597 and RFC 2598. In another possible preferred embodiment, the bits can be the three bits of the Experimental field in an MPLS header after the IP header as defined in RFC 3032. The recognition logic simply recognizes combinations of such bits in order to determine Best Effort or Premium membership of the packet. Exact specification of how the selected bits map to Best Effort or Premium packets is within the skill of one skilled in the art and will not be discussed further.

Figure 3:
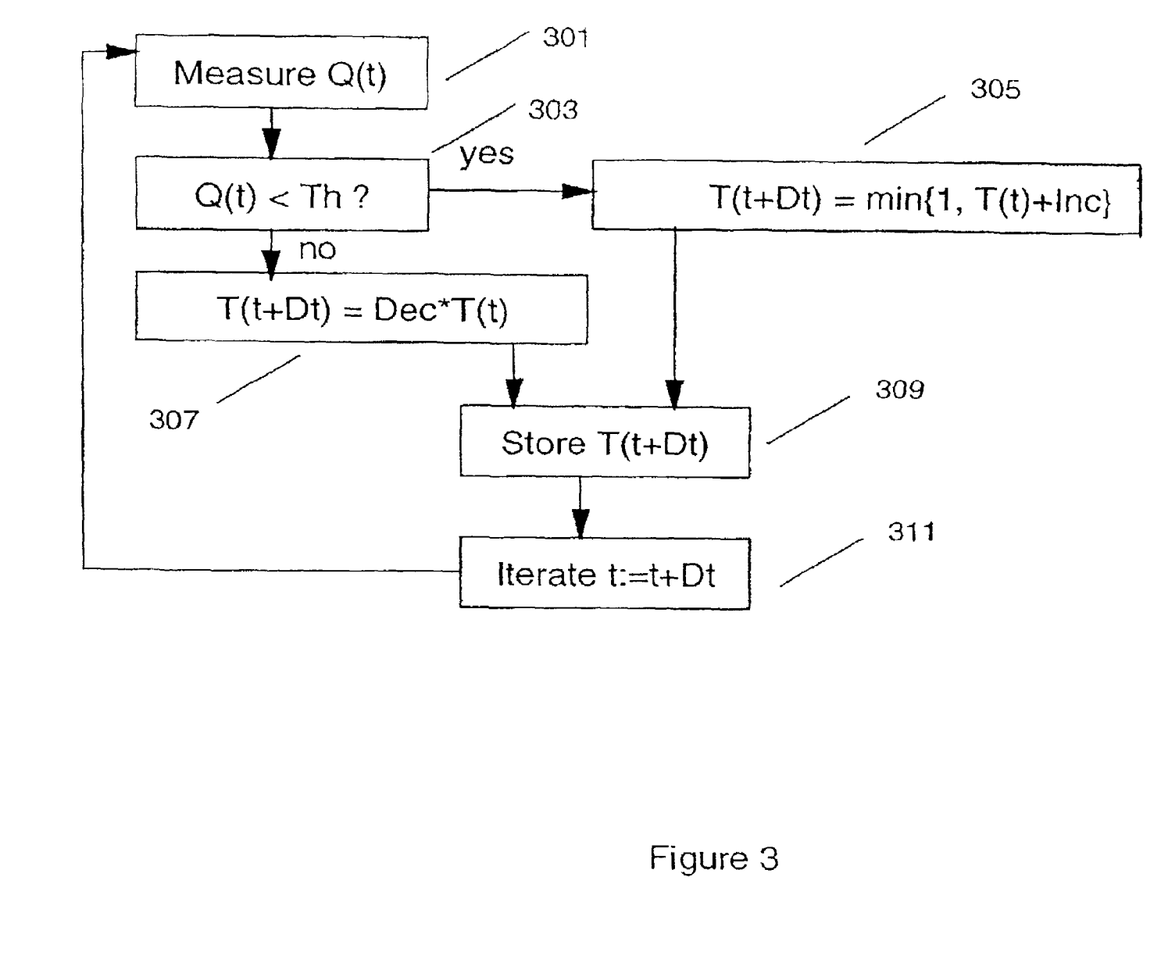
FIG. 3 shows a flow chart for updating flow control transmit probability T(t) to obtain transmit probability T(t+Dt) in accordance with the teachings of the present invention.

Referring to FIG. 3, a mechanism for updating the transmit probability T for Best Effort traffic is depicted. Periodically the state of the queue 203 that holds arriving packets is measured by Queue MD (Measuring Device) located in Queue Controller 218 to determine its value Q(t) 301. The state of the queue (queue occupancy) can be measured in several ways. For example, sensors (not shown) can be positioned at selected locations on the queue to output signals when queue level reaches the position of the sensor. Another technique is to count the packets or frames as they enter the queue. These and other measuring techniques are known in the prior art and will not be discussed further. The value Q(t) is compared to a threshold Th 303 which is measured by sensors (not shown) positioned at selected location of the queue. If Q(t) is less than Th, then the value of T is increased 305 by an amount Inc to as much as 1. If Q(t) is not less than Th, then the value of T is decreased 307 by multiplying by a constant Dec. In either case the new value of T is stored 309 for use by arriving packets and also for use by the same Algorithm A, at the next update time, to refresh its value. Then time is iterated 311 and the logic returns to the starting measurement 301.

Figure 4:
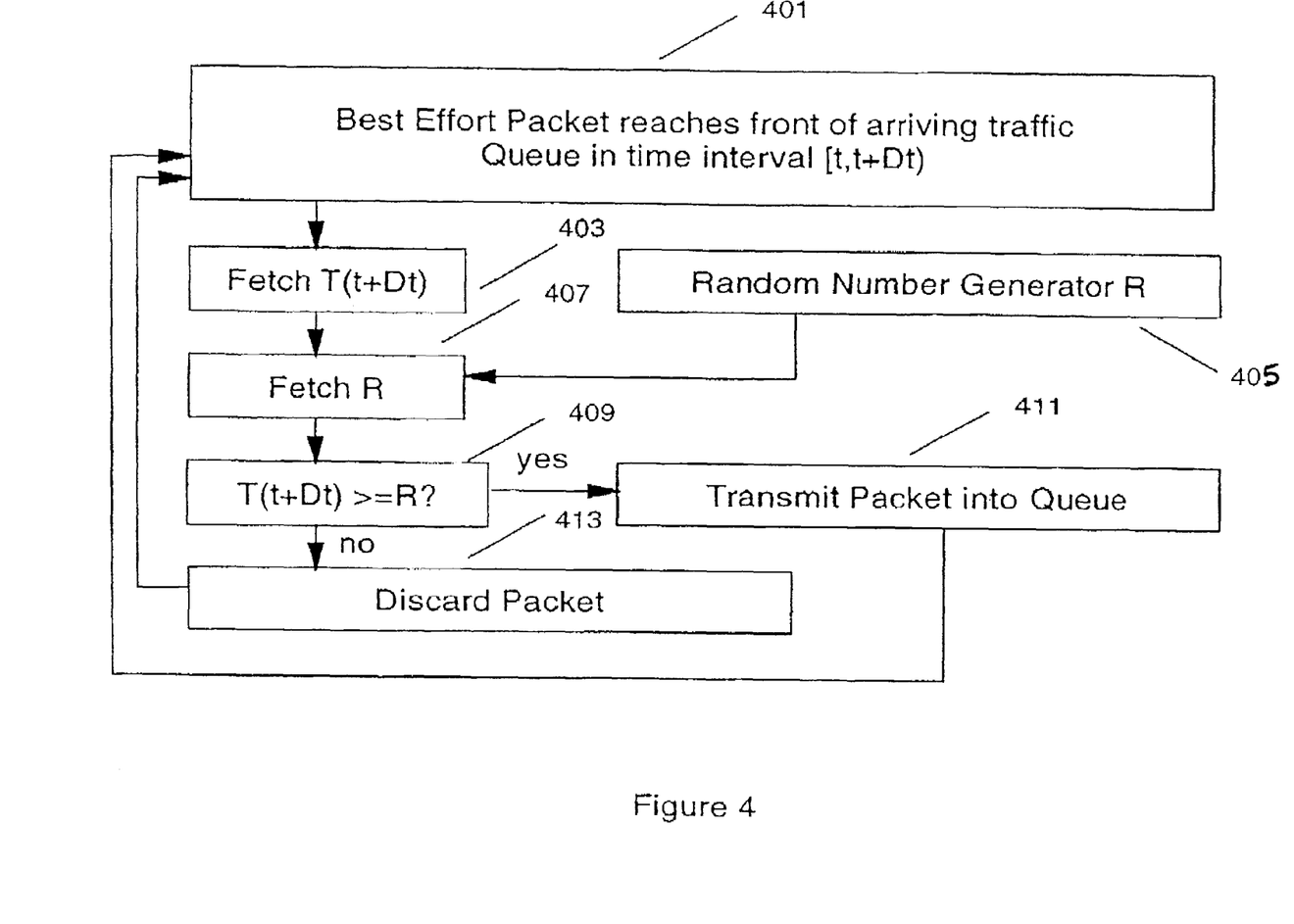
FIG. 4 shows a flow chart for making a decision to transmit or discard a Best Effort packet during a service event. If transmitted, the Best Effort packet is sent to further processing. If discarded, the Best Effort packet is sent to a high speed discard mechanism.

Referring to FIG. 4, a mechanism for using during the time interval [t, t+Dt) the current probability T(t+Dt) to decide to transmit or discard a Best Effort packet is depicted. When a packet arrives 401 at the front of the queue for a service event, the current value of T(t+Dt) is fetched 403. A random number is frequently generated, and the same packet arrival also triggers fetching of a random number R from a random number generator 405. The values of T(t+Dt) and R are compared 409. If T(t+Dt) is greater than or equal to R, then the packet is transmitted 411 to the next processor. If T(t+Dt) is less than R, then the packet is sent to the discard mechanism 413 for fast termination of its use of memory.

It should be noted devices discussed in FIGS. 3 and 4 are provided in Flow Control mechanism 209 (FIG. 1).

Figure 5:
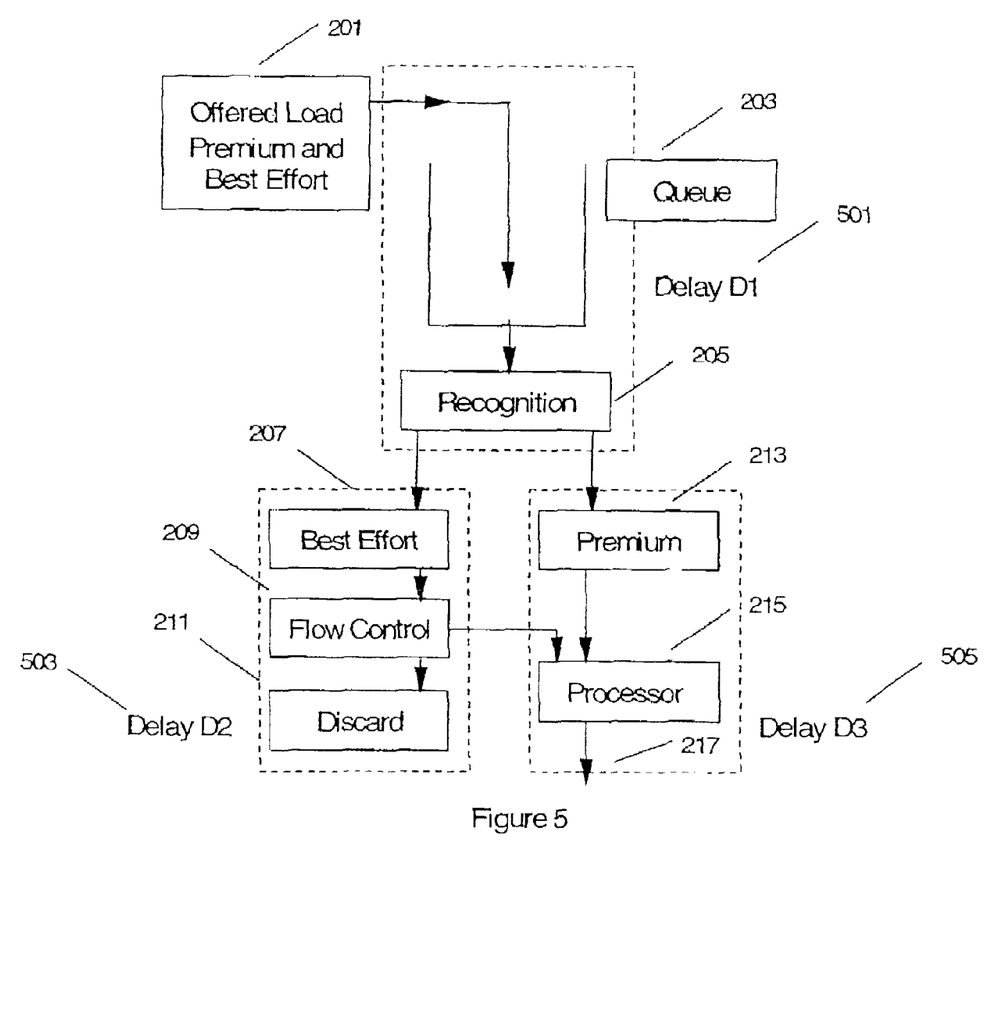
FIG. 5 shows a graphical representation of other flow control factors having a bearing on the present invention.

FIG. 5 can be used to establish approximate numerical constraints on applicability of the present invention. Some common items with FIG. 2 are shown and labeled as such. Offered traffic 201 comprising of a mix of Best Effort and Premium enters a queue 203 at constant rates. There are a certain queue occupancy 203 and a certain amount of recognition 205 processing that together cause a total Delay D1 shown as item 501. Retro Flow Control as taught by the present invention applied to Best Effort packets exiting the queue may send some Best Effort 207 packets through flow control 209 to the discard path 211. All traffic passing through the Discard Path endures a total delay D2 shown as item 503. Retro Flow Control also sends all Premium traffic 213 and some (perhaps none, perhaps all, depending upon congestion) Best Effort traffic 207 through a transmit path to a processor 215 for processing and transmission to the next logical task 217. All traffic flowing through the transmit path experiences a constant delay D3 shown as item 505.

It is assumed throughout that Delay D3 is greater than Delay D2 so during congestion, channeling more traffic to the discard path is a mechanism for limiting total current traffic in flight in the system. This reflects the fact that buffer capacity is finite and that it may be desirable to limit latency (old traffic may become worthless). Retro Flow Control is a mechanism for monitoring total queue occupancy and calculating a transmit fraction T with $0<=T<=1$. If the Best Effort offered load is BE, then the amount of Best Effort that goes into the transmit path is T*BE. The amount of Premium traffic that goes through the transmit path is all of it, designated P. The amount of Best Effort that goes into the discard path is (1−T)*BE.

The present invention also includes provisioning a network with the computational cost of transmission to MFC (Multi-Field Classification) considered so that if all Premium sources simultaneously and continuously send traffic at their guaranteed rates, then congestion due to transmission into MFC will never occur to the extent that Premium packet discards are necessary.

The present invention further includes description of a necessary condition for Retro Flow Control to work in the context of a necessary condition for the existence of an equilibrium.

Suppose offered traffic arrives in packets of constant size S bits at the rate R bps. Each packet is delayed D seconds to process, so processing proceeds at S/D bps. If S/D is less than R, then the queue grows indefinitely. If S/D is greater than R, then typically the number of packets in the queue awaiting service is zero or one.

The model is as follows. Offered traffic consisting of a mix of Best Effort and Premium enters a queue at constant rates. (See FIG. 5.) There is a certain queue occupancy that causes a processing Delay D1. Retro Flow Control out of the queue may send some Best Effort traffic to the Discard Path. All traffic passing through the Discard Path endures a Delay D2. Retro Flow Control also sends all Premium traffic and some Best Effort traffic to the Transmit Path. All traffic flowing through the Transmit Path experiences a constant Delay D3.

It is assumed throughout that Delay D3 is greater than Delay D2 so during congestion, channeling more traffic to the discard path is a mechanism for limiting total current traffic in flight in the system. This reflects the fact that buffer capacity is finite and that it may be desirable to limit latency (old traffic may become worthless). Retro Flow Control is a mechanism for monitoring total queue occupancy and calculating a transmit fraction T with $0<=T<=1$. If the Best Effort offered load is BE, then the amount of Best Effort that goes into the transmit path is T*BE. The amount of Premium traffic that goes through the transmit path is all of it, designated P. The amount of Best Effort that goes into the discard path is (1−T)*BE.

To stay at low occupancy during constant loads, it is necessary that three inequalities are true:

$$P+BE<=S/D1$$

$$(1-T)*BE<=S/D2$$

$$T*BE+P<=S/D3 \quad (EQ1)$$

where P represents the arrival rate of Premium traffic, BE represents the arrival rate of Best Effort traffic, S represents the common (in this simple model) Size of all packets, D1 represents the delay experienced by all packets in the arrival queue, T represents the transmit probability, D2 represents the delay experienced by Best Effort packets in the discard path, and D3 represents the delay experienced by all packets in the transmit path.

If the inequalities in (EQ1) are all true, then the optimal solution is $$T=(S/D3-P)/BE>=1-S/(D2*BE) \quad (EQ2)$$

For example, suppose all frames are 64 Bytes=512 b. Suppose flow rates are BE=1 Gbps and P=1 Gbps. Suppose D1=100 ns, D2=200 ns, D3=400 ns. Then a solution is possible because the three inequalities in (EQ1) are:

$$(P+BE)=2 \text{ Gbps}<S/D1=512/100 \text{ ns}=5.12 \text{ Gbps}$$

$$BE=1 \text{ Gbps}<S/D2=512/200 \text{ ns}=2.56 \text{ Gbps}$$

$$P=1 \text{ Gbps}<S/D3=512/400 \text{ ns}=1.28 \text{ Gbps}$$

In fact, for optimal throughput, (EQ2) yields $$T=(S/D3-P)/BE=(1.28 \text{ Gbps}-1 \text{ Gbps})/1 \text{ Gbps}=0.28$$

The present invention includes the fact Algorithm A above will automatically find a good approximation of the ideal T.

For instance, a communication system may comprise: a buffer for receiving packets; a flow control mechanism for transmitting premium packets from a first queue for newly arriving packets formed in said buffer into a second queue to await further processing and, if necessary due to congestion in the first queue, executing an algorithm that gracefully discarding some Best Effort packets in the first queue as they reach the front of the first queue about to be further processed, with ever increasing probability of discard, that is, decreasing probability of transmission, until an equilibrium that avoids overflowing the first queue is reached; and a mechanism for storing constant values, measured dynamic variables, and calculated variables that implements the algorithm.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teaching and advanced use of this invention. Accordingly, all such modifications are intended to be included within the scope of this invention as defined in the claims.

What is claimed is:

1. A communication system comprising:
   a buffer for receiving packets;
   a processor for transmitting premium packets from a first queue for newly arriving packets formed in said buffer into a second queue to await further processing and, based upon measurement of a queue occupancy Q(t), discarding some Best Effort packets in accordance with a transmit probability T(t), which is periodically updated, wherein the transmit probability T(t) at each update, in response to the queue occupancy being less than a preselected constant threshold, is increased to a value between a current transmit probability value and a maximum transmit probability value and, in response to the queue occupancy being greater than the preselected constant threshold, is decreased to a value between the current transmit probability value and a minimum transmit probability value; and
   a memory for storing constant values, measured dynamic variables, and calculated variables for discarding some Best Effort packets in the first queue.

2. The communication system according to claim 1, further comprising the processor for calculating a period to refresh the transmit probability T(t).

3. The communication system according to claim 1, further comprising the mechanism processor for determining queue occupancy Q(t) periodically at certain time values.

4. The communication system according to claim 1, further comprising the processor for comparing the queue occupancy Q(t) with the preselected constant threshold called Th having the relation 0<Th<Qmax where Qmax is the maximum storage capacity of the buffer.

5. The communication system according to claim 1, further comprising the processor for including comparisons in the queue occupancy Q(t) and the transmit probability T(t) as inputs into an algorithm to compute a subsequent transmit probability T(t+Dt) in accordance with the following equations:
   If the queue occupancy, Q(t), >the preselected threshold, Th, then the subsequent transmit probability T(t+Dt)=Dec*T(t), wherein Dec is a value between zero and one and * represents multiplication; and
   If the queue occupancy, Q(T), <=the preselected threshold, Th, then the subsequent transmit probability T(t+Dt)=minimum {1, T(t)+Inc}, wherein Inc is a value between zero and one and + represents addition.

6. The communication system according to claim 1, further comprising the processor for generating random numbers with a random number generator.

7. The communication system according to claim 6, further comprising the processor for, upon the arrival of a Best Effort Data packet in the time interval [t, Dt], performing a comparison of a current state of the random number generator with a value of a subsequent transmit probability T(t+Dt) stored as an output of an algorithm.

8. The communication system according to claim 7, further comprising the processor for transmitting the Best Effort Data packet if the current state of said random number generator is less than or equal to said value of the subsequent transmit probability T(t+Dt).

9. The communication system according to claim 7, further comprising the processor for discarding the Best Effort Data packet if the current state of the random number generator is greater than said value of the subsequent transmit probability T(t+Dt).

10. The communication system according to claim 6, wherein a current state of the random number generator and a value of the subsequent transmit probability T(t+Dt) are both fractions between 0 and 1.0.

11. The communication system according to claim 1, further comprising the processor for updating the value of the transmit probability T(t), wherein updating the value of the transmit probability T(t) comprises increasing a subsequent the subsequent transmit probability T(t+Dt) in response to the queue occupancy Q(t) decreasing below the preselected constant threshold and decreasing the subsequent transmit probability T(t+Dt) in response to the queue occupancy Q(t) increasing above the preselected constant threshold.

12. The communication system according to claim 1, further comprising the processor for updating a subsequent transmit probability T(t+Dt) based upon queue occupancy Q(t) and a current value of the transmit probability T(t).

13. The communication system according to claim 1, further comprising the processor for measuring the queue occupancy Q(t) as a frame count, then comparing to a threshold Th of the frame count and if the queue occupancy Q(t) is less than Th, updating the transmit probability T(t) by a linear increase by a constant up to a limiting value of 1.

14. The communication system according to claim 1, further comprising the processor for measuring the queue occupancy Q(t) as a frame count, then comparing to a threshold Th of the frame count and if the queue occupancy Q(t) is greater than or equal to Th, updating the transmit probability T(t) by multiplication by a constant multiplier of less than 1.

15. The communication system according to claim 14, wherein the threshold Th includes 40 frames.

16. The communication system according to claim 1, further comprising a recognition logic for recorgnizing voice packets, video packets, video conferencing packets, other realtime packets, business data packets, and network control packets as Premium packets, and recognizing all other packets as Best Effort packets.

17. The communication system according to claim 1, further comprising processor for determining a period Dt wherein determining comprises determining a fraction of Qmax/S, wherein Qmax is a maximum queue capacity and S is the highest possible rate at which the first queue could be filled.

18. The communication system according to claim 1, further comprising the processor for determining the queue occupancy Q(t) wherein determining the queue occupancy Q(t) comprises measuring a frame count for the queue occupancy Q(t).

* * * * *